(12) United States Patent
Sanders et al.

(10) Patent No.: US 7,502,368 B2
(45) Date of Patent: Mar. 10, 2009

(54) METHOD AND APPARATUS FOR SWITCHING A SOURCE OF AN AUDIOVISUAL PROGRAM CONFIGURED FOR DISTRIBUTION AMONG USER TERMINALS

(76) Inventors: John Sanders, 16609 Archie Moore Rd., Ramona, CA (US) 92065; Guofei Wu, 10644 Hunters Glen Dr., San Diego, CA (US) 92130; Yuan-Yuan Young, 5199 SeaShell Pl., San Diego, CA (US) 92130; Vincent Cheng-Teh Liu, 7714 Roan Rd., San Diego, CA (US) 92129

( * ) Notice: Subject to any disclaimer, the term of this patent is extended or adjusted under 35 U.S.C. 154(b) by 855 days.

(21) Appl. No.: 10/820,595

(22) Filed: Apr. 8, 2004

(65) Prior Publication Data

US 2005/0226276 A1  Oct. 13, 2005

(51) Int. Cl.
*H04L 12/28* (2006.01)
(52) U.S. Cl. ...................................... 370/389
(58) Field of Classification Search ............ 370/395.64, 370/389, 390, 394, 401, 471, 353, 354, 395.65; 375/240, 240.05, 240.26, 259; 380/241; 382/232; 725/32, 89, 136
See application file for complete search history.

(56) References Cited

U.S. PATENT DOCUMENTS 5,982,436 A * 11/1999 Balakrishnan et al. . 375/240.05
6,137,834 A * 10/2000 Wine et al. ................... 375/240
6,588,015 B1 * 7/2003 Eyer et al. ...................... 725/89
6,611,624 B1 * 8/2003 Zhang et al. ................. 382/232
6,678,332 B1 * 1/2004 Gardere et al. .......... 375/240.26
7,062,048 B2 * 6/2006 Livaditis et al. ............. 380/241
7,096,481 B1 * 8/2006 Forecast et al. ............... 725/32
7,292,583 B2 * 11/2007 Schoenblum .......... 370/395.64
7,305,040 B1 * 12/2007 Yoshinari et al. ............ 375/259
2002/0154694 A1 * 10/2002 Birch ..................... 375/240.05
2005/0015816 A1 * 1/2005 Christofalo et al. ......... 725/136

OTHER PUBLICATIONS

"Digital Program Insertion Splicing Application Program Interface," Soc. Cable Telecomm Eng., Engineering Committee, Digital Video Subcom., ANSI/SCTE 30 2001, 1-36.

* cited by examiner

*Primary Examiner*—Chi H Pham
*Assistant Examiner*—Alexander Boakye
(74) *Attorney, Agent, or Firm*—Stewart M. Wiener

(57) ABSTRACT

A method and apparatus for switching a source of an audiovisual program configured for distribution among a plurality of user terminals is described. In one example, a first real-time digital bitstream and a second real-time digital bitstream are received. The source is mapped to the first real-time digital bitstream. A request is received from a remote controller. The request is operative to switch the source of the audiovisual program. The source of the audiovisual program is switched to the second real-time digital bitstream in response to the request. Time stamp data in the second real-time digital bitstream is adjusted to provide a continuous time base for the audiovisual program.

19 Claims, 4 Drawing Sheets

_US 7,502,368 B2_

METHOD AND APPARATUS FOR SWITCHING A SOURCE OF AN AUDIOVISUAL PROGRAM CONFIGURED FOR DISTRIBUTION AMONG USER TERMINALS

BACKGROUND OF THE INVENTION

1. Field of the Invention

The present invention generally relates to audiovisual program distribution systems and, more particular, to switching a source of an audiovisual program configured for distribution among user terminals.

2. Description of the Related Art

Digital bitstream splicing is a process that replaces part of a bitstream with another bitstream. Typically, such a splicing operation has been used to insert an advertisement into a program stream of a network feed. In such an application, the program stream is a real-time feed from a distribution network (i.e., a live stream) and the advertisement is fetched from a storage medium (i.e., a stored stream). The insertion is typically short in duration, which allows the advertisement stream to be stored (e.g., one or two minutes in duration).

Historically, digital bitstream splicing operation has not been used to substitute a program stream from one live feed with a program feed from another live feed for a long-term or indefinite duration. Instead, such program substitution is achieved by switching uncompressed video and audio where the digital signals are decoded prior to switching and re-encoded after switching. This decoding/re-encoding process may deleteriously affect the digital signals by degrading the integrity of the data.

Accordingly, there exists a need in the art for a method and apparatus that switches a source of an audiovisual program configured for distribution among user terminals in the digital domain for long-term or indefinite periods.

SUMMARY OF THE INVENTION

A method and apparatus for switching a source of an audiovisual program configured for distribution among a plurality of user terminals is described. In one embodiment, a first real-time digital bitstream and a second real-time digital bitstream are received. The source is mapped to the first real-time digital bitstream. A request is received from a remote controller. The request is operative to switch the source of the audiovisual program. The source of the audiovisual program is switched to the second real-time digital bitstream in response to the request. Time stamp data in the second real-time digital bitstream is adjusted to provide a continuous time base for the audiovisual program.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION OF THE INVENTION

Figure 1:
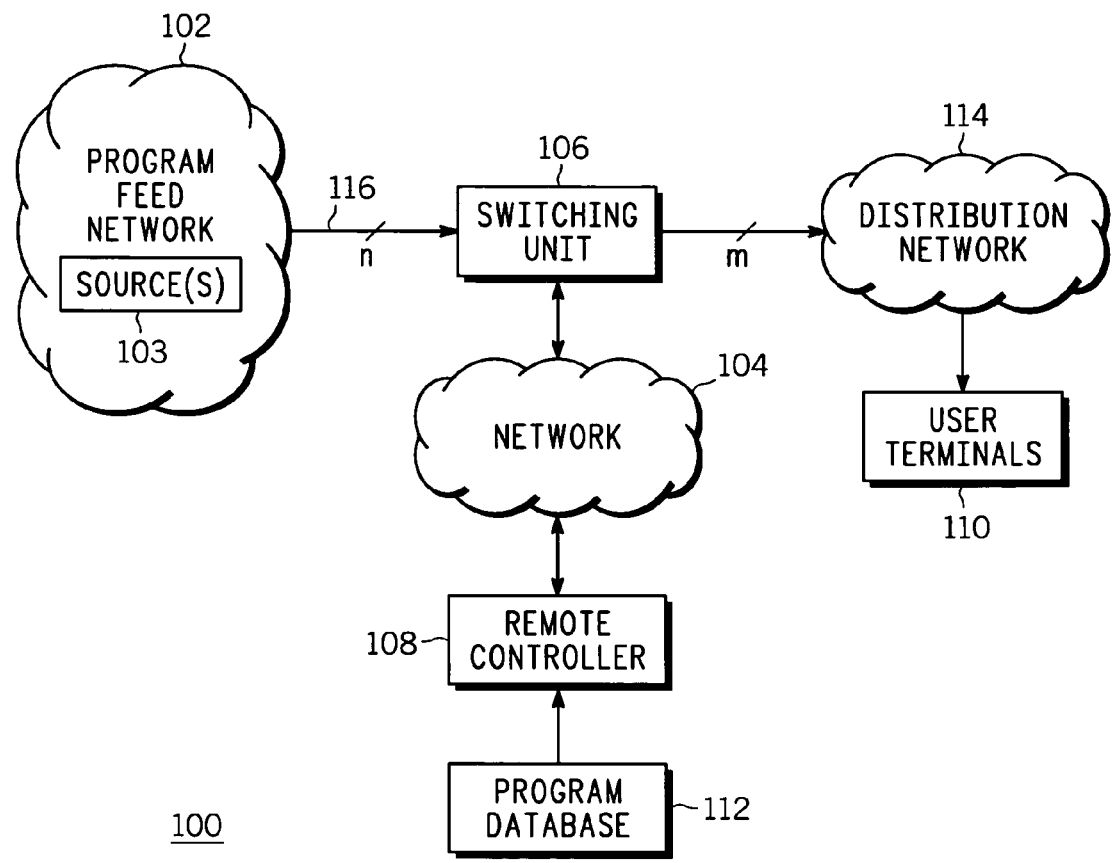
FIG. 1 a block diagram depicting an exemplary embodiment of an audiovisual program distribution system.

FIG. 1 a block diagram depicting an exemplary embodiment of an audiovisual program distribution system 100. The system 100 comprises a program feed network 102, a switching unit 106, a remote controller 108, a network 104, a distribution network 114, a program database 112, and a plurality of user terminals 110. An interface of the switching unit 106 is coupled to the program feed network 102 via a communication link 116. Another interface of the switching unit 106 is coupled to the remote controller 108 through the network 104. An output interface of the switching unit 106 is coupled to the distribution network 114. The user terminals 110 are configured to receive audiovisual programs from the distribution network 114 (also referred to as services or channels). As used herein, the term "audiovisual program" or "program" encompasses a program, service, or channel having at least one of a video component, an audio component, and an ancillary data component.

The program feed network 102 is configured to provide a set of input programs ("input multiplex"). As shown, the input multiplex comprises n input programs, where n is an integer greater than zero. The program feed network 102 provides the input programs in real time. For example, the program feed network 102 may comprise a plurality of sources 103 (e.g., television networks) configured to provide the input programs via a real-time or "live" feed. Each of the input programs comprises a digital bitstream having at least one of a video component, an audio component, and a data component. For example, each of the input programs may comprise an MPEG-compliant compressed bitstream, such as an MPEG-2 bitstream as defined in ISO/IEC Standard 13818.

The input multiplex is coupled to the switching unit 106 via the communication link 116. The communication link 116 may comprise any type of communication medium known in the art, such as land-based radio-frequency type broadcast links, cable links, space satellite signal transmission links, broadband telephone links, and the like. For purposes of clarity by example, only a single communication link is shown between the program feed network 102 and the switching unit 106. It is to be understood, however, that the program feed network 102 may be coupled to the switching unit 106 via multiple physical communication links. The input multiplex may be conveyed using one or more digital transport streams, such as MPEG-2 transport streams, or like type transport streams known in the art. For example, the input multiplex may be conveyed by multiple single program transport streams (SPTSs), one or more multi-program transport streams (MPTSs), or a combination thereof.

The switching unit 106 is configured to provide a set of output programs ("output multiplex"). As shown, the output multiplex comprises m output programs, where m is an integer greater than zero. The output multiplex may be conveyed using one or more digital transport streams, such as MPEG-2 transport streams, or like type transport streams known in the art. For example, the output multiplex may be conveyed by multiple SPTSs, one or more MPTSs, or a combination thereof. The output multiplex is coupled to the user terminals 110 via the distribution network 114. The distribution network may be a satellite-based transmission network, a terrestrially-based radio frequency transmission network, a cable network, and like type distribution networks known in the art. The user terminals 110 process the output programs in a well-known manner to display the audio/video/data data contained therein. For example, the output programs may comprise MPEG bitstreams and the user terminals 110 may include MPEG decoders for decoding the MPEG bitstream information.

The switching unit 106 is operable to switch (i.e., multiplex) the input programs among the output programs. In other words, the switching unit 106 maps the sources of the output programs to the bitstreams of particular ones of the input programs. The current mapping between the input programs and the output programs is controlled by the remote controller 108 and is stored in the program database 112. The remote controller 108 communicates control information to the switching unit 106 via the network 104. The network 104 may comprise any type of data communications network known in the art, such as a transmission control protocol/internet protocol (TCP/IP) network. The remote controller 108 may comprise, for example, a computer.

As described below, the input multiplex provided by the program feed network 102 includes a group of primary programs to be switched among the output programs of the switching unit 106. In addition, the input multiplex may include one or more alternate programs to be substituted for a respective one or more of the primary programs ("substitute programs"). The switching unit 106 is advantageously configured to switch a source of an output program from a bitstream of a primary program ("primary bitstream") to a bitstream of a substitute program ("substitute bitstream") in the digital domain (i.e., without decoding/re-encoding the bitstreams) for a long-term or an indefinite substitution period. The switching unit 106 initiates a particular substation session in response to a request from the remote controller 108 received over the network 104. The request identifies the primary bitstream and the substitute bitstream, provides a time of substitution, and may provide a substitute period.

Figure 2:
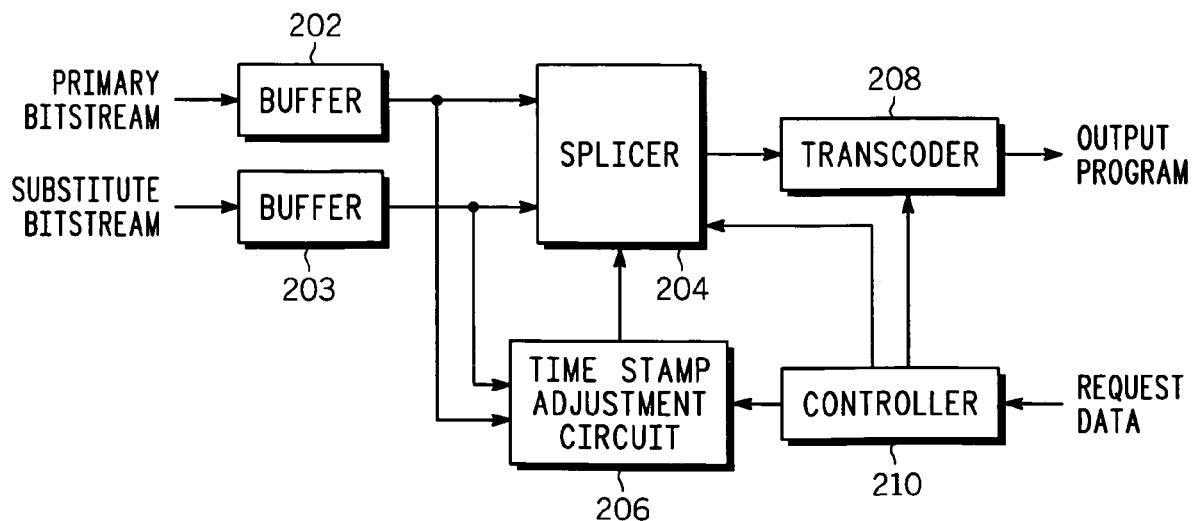
FIG. 2 is a block diagram depicting an exemplary embodiment of the switching unit of FIG. 1 constructed in accordance with one or more aspects of the invention.

Notably, FIG. 2 is a block diagram depicting an exemplary embodiment of the switching unit 106 of FIG. 1 constructed in accordance with one or more aspects of the invention. The switching unit 106 illustratively comprises a buffer 202, a buffer 203, a splicer 204, a time stamp adjustment circuit 206, a transcoder 208, and a controller 210. For purposes of clarity by example, the switching unit 106 is described with respect to a pair of primary/substitute bitstreams associated with a single output program. Those skilled in the art will appreciate, however, that the switching unit 106 may be configured to switch multiple pairs of primary/substitute bitstreams in an input multiplex among multiple output streams in an output multiplex. In such an embodiment, additional buffers are provided at the input of the splicer 204 for the additional bitstreams, the splicer includes additional output ports for the additional output programs, and additional transcoders are provided for each of the additional output ports of the splicer. Alternatively, a single transcoder may be configured to transcoder multiple output programs from the splicer, in which case the transcoder includes additional output ports for each of the additional output programs.

Each of the buffer 202 and the buffer 203 includes an input interface and an output interface. The input interface of the buffer 202 is configured to receive a primary bitstream, and the input interface of the buffer 203 is configured to receive a substitute bitstream. The output interface of the buffer 202 is coupled to an input interface of the splicer 204 and an input interface of the time stamp adjustment circuit 206. The output interface of the buffer 203 is coupled to another input interface of the splicer 204 and another input interface of the time stamp adjustment circuit 206. Although the buffers 202 and 203 are shown as separate components, it is to be understood that the buffers 202 and 203 may be logical buffers within a single physical memory device.

An output interface of the time stamp adjustment circuit 206 is coupled to a third input interface of the splicer. An output interface of the splicer 204 is coupled to an input interface of the transcoder 208. An output interface of the transcoder 208 is configured to provide an output program. Control interfaces of the splicer 204, the time stamp adjustment circuit 206, and the transcoder 208 are coupled to the controller 210. The controller 210 may comprise combinatorial logic, a processor, such as a microprocessor, instruction-set processor (e.g., microcontroller), and the like, or a combination of combinatorial logic and processor components. Furthermore, the components of the switching unit 106 may be discrete components, or may be part of an integrated circuit, such as an application specific integrated circuit (ASIC) or a field programmable gate array (FPGA). Alternatively, the components of the switching unit 106 may be implemented as software executed by a computer, shown in FIG. 6, or as a combination of hardware and software, including any number of processors independently executing various programs in conjunction with dedicated hardware.

In operation, the primary bitstream and the substitute bitstream are buffered in the buffer 202 and the buffer 203, respectively. The buffers 202 and 203 may comprise any type of memory device known in the art. Initially, the splicer 204 maps the primary bitstream to the source of the output program. In response to a substitution request, the controller 210 directs the splicer 204 to splice the substitute bitstream into the primary bitstream. That is, the splicer 204 switches the source of the output program from the primary bitstream to the substitute bitstream. As described below, the substitution request includes information for establishing the substitution session, such as identities of the primary and substitute bitstreams, the time of substitution, and the period of substitution.

In one embodiment, the substitution period may be a set long-term duration. For example, the source of the output program may be mapped to the substitute bitstream for periods up to 12 hours. After the substitution period has expired, the controller 210 directs the splicer 204 to return the source of the output program to the primary bitstream. Alternatively, rather than a set long-term duration, the substitution period may be indicated as being an indefinite period. In the case of an indefinite substitution period, the source of the output program may be returned to the primary bitstream in response to a return request received by the controller 210. The controller 210 may receive various other types of request data, such as a cancellation requests (i.e., cancellation of a scheduled substitution request).

As described above, the request data are received from a remote controller over a network. The controller 210 is configured to support an application programming interface (API) that allows for remote control of program substitution functions (e.g., substitutions, returns to primary programs, cancellations). The request data transmitted by the remote controller is formatted in accordance with the API implemented by the controller 210. One example of an API that may be adapted for use with the invention is set forth in the ANSI/SCTE 30 standard (American National Standard/Society of Cable Telecommunications Engineers). Notably, each request message consists of a common header followed by a data structure specific to the purpose of the message. Exemplary formats for the specific request data are described below.

The splicer 204 is capable of splicing audio/video/data components of one of the substitute and primary bitstreams with respective audio/video/data components of the other of the substitute and primary bitstreams. The splicer 204 splices the substitute bitstream into the primary bitstream without decoding either the substitute bitstream or the primary bitstream. That is, the splicer 204 switches the source of the output program in the digital domain, which eliminates the degradation associated with a decoding/re-encoding process. The transcoder 208 processes the bitstream output by the splicer 204 to adjust the bit-rate of the bitstream for a pre-defined period. For example, the transcoder 208 may temporarily adjust the bit-rate to normalize the buffer in the decoder of the user terminals before maintaining the target bit-rate of the bitstream. The transcoder 208 and its operation are conventionally known in the art.

In addition, since the substitution period is either long-term or indefinite in nature, time stamp data in the substitute bitstream must be adjusted to provide a continuous time base for the output program. This is in contrast to conventional short-term splicing schemes used to insert stored data streams, such as stored advertisement data streams, into an output programs. In such short-term splicing schemes, the time stamp data within the stored data stream may be retained during the splice period due to the short-term nature of the splice (e.g., several seconds to a few minutes).

The time stamp adjustment circuit 206 extracts timing data from the primary bitstream and the substitute bitstream. Such timing data may include, for example, program clock reference (PCR) data, presentation time stamp (PTS) data, decoder time stamp (DTS) data, and like type timing data known in the art. As is well-known in the art, PCR time stamps are used to provide a timing reference at the decoder. The PTS/DTS time stamps are used to indicate when particular frames or pictures are to be displayed at the decoder. The controller 210 directs the time stamp adjustment circuit 206 to compute offset data to adjust the time stamp data of the substitute bitstream for providing a continuous time base for the output program. The time stamp adjustment circuit 206 computes the offset data using the extracted timing data from the primary bitstream and the substitute bitstream. An exemplary process for adjusting the time stamp data of the substitute bitstream is described below. The time stamps in the substitute bitstream may be adjusted within the splicer 204 using the offset data.

Figure 3:
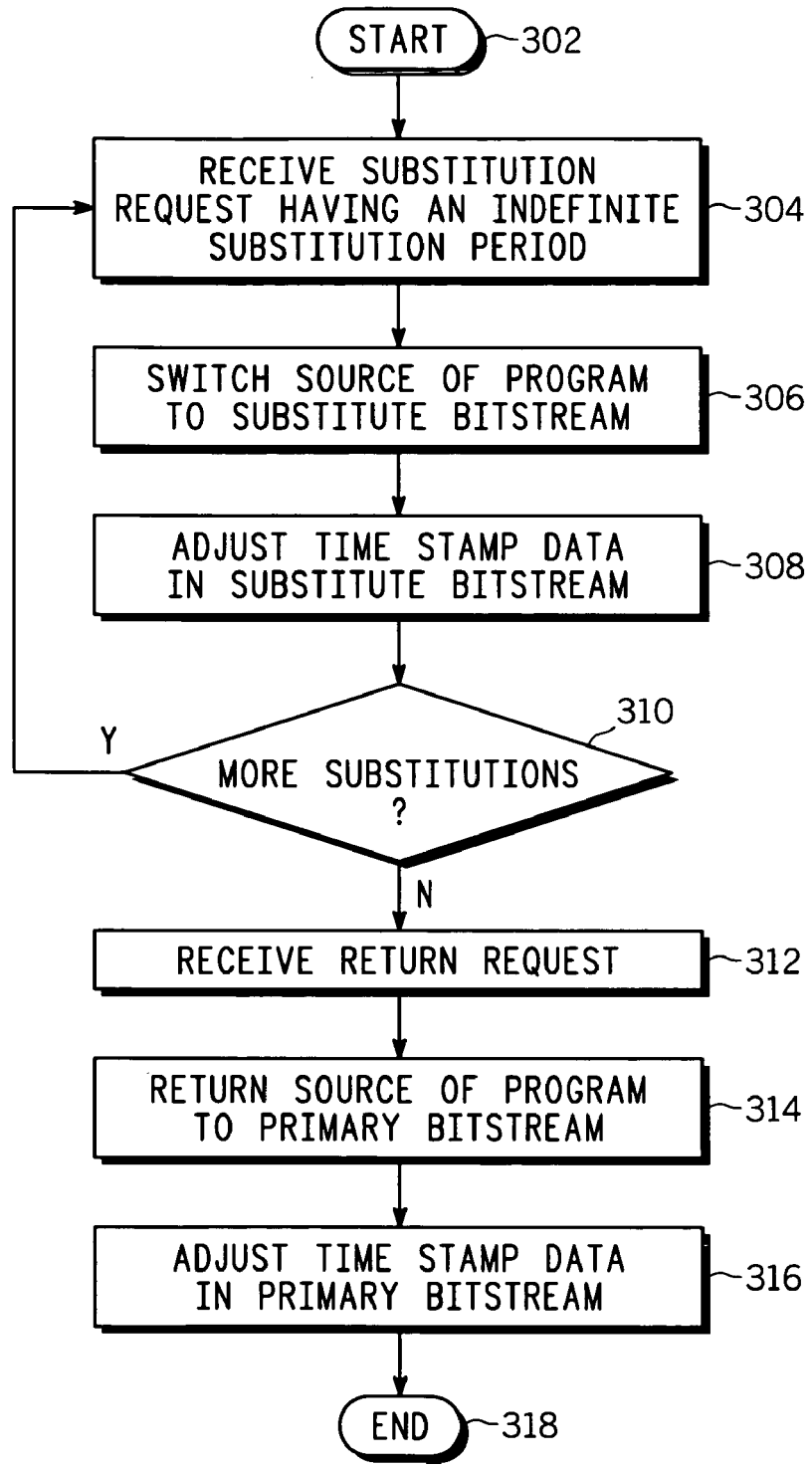
FIG. 3 is a flow diagram depicting an exemplary embodiment of a process for switching a source for an audiovisual program configured for distribution among a plurality of user terminals.

FIG. 3 is a flow diagram depicting an exemplary embodiment of a process 300 for switching a source for an audiovisual program configured for distribution among a plurality of user terminals. Aspects of the process 300 may be understood with reference to FIGS. 1 and 2. The process 300 begins at step 302. At step 304, a substitution request is received having an indefinite substitution period. The substitution request is transmitted from the remote controller 108 to the switching unit 106 via the network 104. In one embodiment of the invention, the substitution request is in a format compliant with SCTE 30. Notably, the substitution request may include one or more of an identifier for the substitution session, an identifier for the audiovisual program, and identifier for the substitution bitstream, a substitution time, and a substitution period. In the present embodiment, the substitution period is indicated as being indefinite.

At step 306, the source of the audiovisual program is switched to the substitute bitstream. The switching unit 106 may perform the substitution at a time specified by the substitution request received at step 304. At step 308, time stamp data in the substitute bitstream is adjusted to provide a continuous time base for the audiovisual program. An exemplary process for adjusting time stamp data is described below with respect to FIG. 5.

At step 310, a determination is made as to whether additional substitutions are to be made. If so, the process 300 returns to step 304 and repeats for an additional substitution request and an additional substitution bitstream. Otherwise, the process 300 proceeds to step 312.

At step 312, a return request is received. The return request is transmitted from the remote controller 108 to the switching unit 106 over the network 104. Since the SCTE 30 API is designed for splices having a defined duration (e.g., digital advertisement insertion), the standard does not define a return request message. However, the return request of the invention may be in a format compliant with SCTE 30, and may include an identifier for the substitution session, an identifier for the primary bitstream, and identifier for the substitution bitstream, and a return time. At step 314, the source of the audiovisual program is returned to the primary program stream. The switching unit 106 may perform the return at a time specified by the return request received at step 312. At step 316, time stamp data in the primary bitstream is adjusted to maintain a continuous time base for the audiovisual program. The process 300 ends at step 318.

Figure 4:
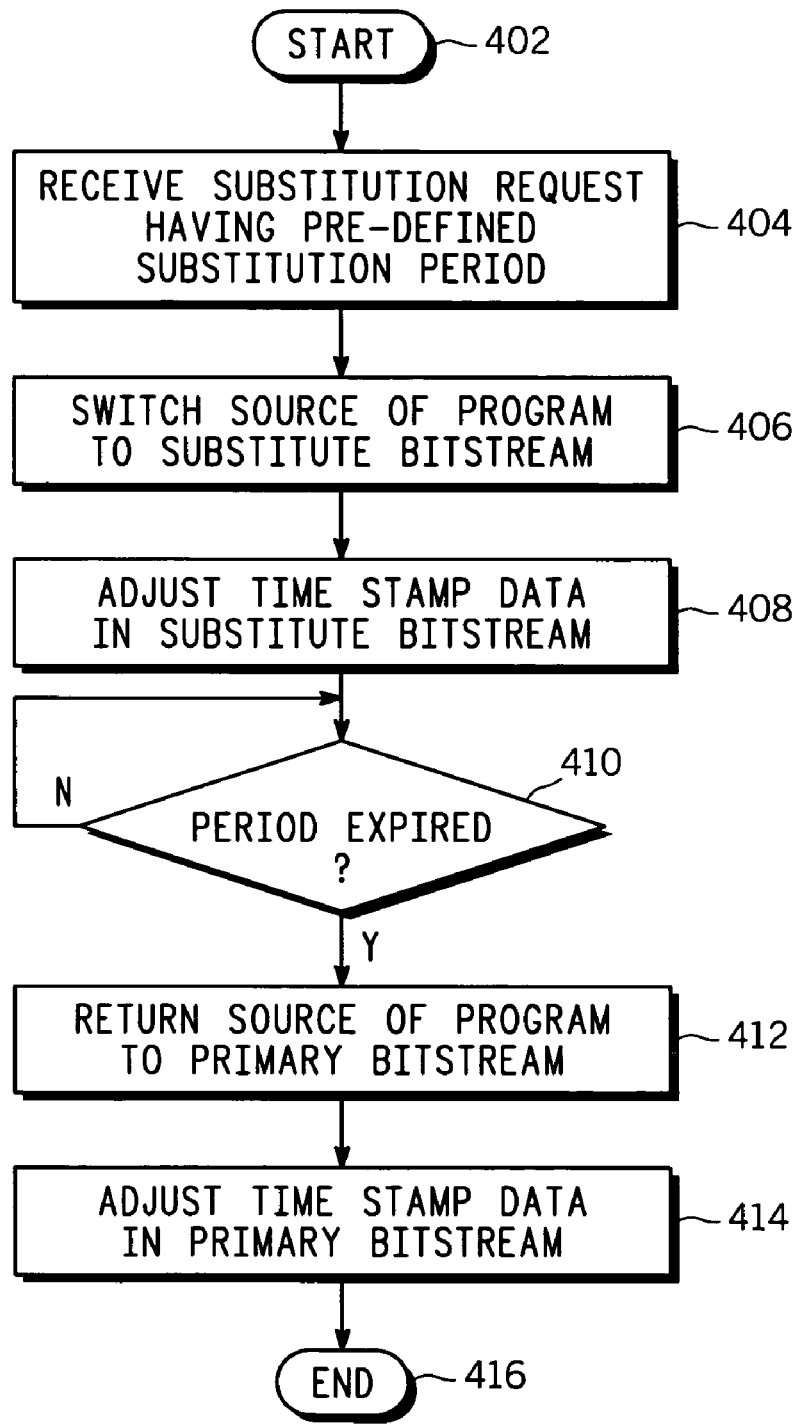
FIG. 4 is a flow diagram depicting another exemplary embodiment of a process for switching a source for an audiovisual program configured for distribution among a plurality of user terminals.

FIG. 4 is a flow diagram depicting another exemplary embodiment of a process 400 for switching a source for an audiovisual program configured for distribution among a plurality of user terminals. Aspects of the process 300 may be understood with reference to FIGS. 1 and 2. The process 400 begins at step 402. At step 404, a substitution request is received having a pre-defined substitution period. An exemplary format for the substitution message is described above. At step 406, the source of the output program is switched to the substitute bitstream. The switching unit 106 may perform the substitution at a time specified by the substitution request received at step 404. At step 408, time stamp data in the substitute bitstream is adjusted to provide a continuous time base for the audiovisual program.

At step 410, a determination is made as to whether the substitution period has expired. If not, the process 400 holds at step 410. Otherwise, the process 400 proceeds to step 412. At step 412, the source of the output program is returned to the primary bitstream. The switching unit 106 performs the return upon expiration of the substitution period. At step 414, time stamp data in the primary bitstream is adjusted to maintain a continuous time base for the audiovisual program. The process 400 ends at step 416.

Figure 5:
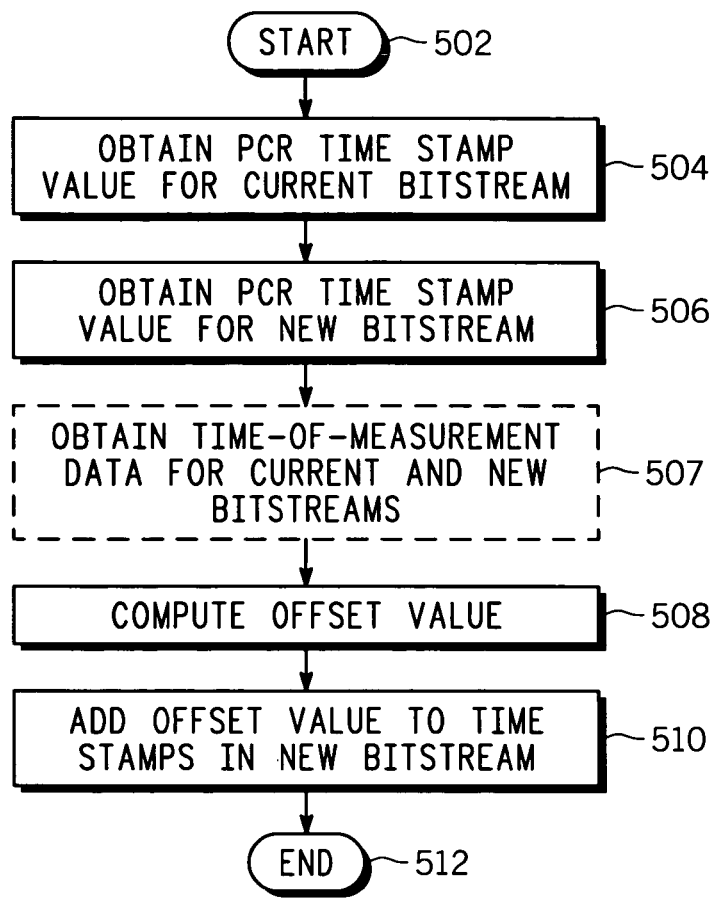
FIG. 5 is a flow diagram depicting an exemplary embodiment of a process for adjusting time stamp data in response to a bitstream substitution in accordance with one or more aspects of the invention.

FIG. 5 is a flow diagram depicting an exemplary embodiment of a process 500 for adjusting time stamp data in response to a bitstream substitution in accordance with one or more aspects of the invention. The process 500 may be performed within the processes 300 and 400 described above. For purposes of clarity by example, the process 500 is described herein with respect to program clock reference (PCR) data as defined in an MPEG stream. It is to be understood, however, that the process 500 may use other types of clock reference data in other types of digital streams. Aspects of the process 500 may be understood with reference to FIGS. 1 and 2.

The process 500 begins at step 502. At step 504, a PCR time stamp is obtained for a current bitstream. The current bitstream is the current source of the particular audiovisual program being processed (e.g., primary bitstream in a substitution operation or a substitute bitstream in a return operation). At step 506, a PCR time stamp is obtained for a new bitstream. The new bitstream is the bitstream that is to replace the current bitstream as the source of the audiovisual program (e.g., substitute bitstream during a substitution operation or primary bitstream in a return operation).

At step 508, an offset PCR value is computed using PCR time stamp data of the current bitstream and PCR time stamp data of the new bitstream. For example, the offset PCR value may be computed as follows:

$$TS_1 - TS_2,$$

where $TS_1$ represents the current PCR time stamp and $TS_2$ represents the new PCR time stamp. The above equation for the offset PCR value assumes that the PCR time stamps obtained at steps 504 and 506 were measured at the same time within the switching unit 106. In another embodiment of the invention, an offset PCR value may be computed if the PCR time stamps are measured at different times. Notably, an optional step 507 may be performed prior to step 508 to obtain time-of-measurement data for each of the current PCR time stamp and the new PCR time stamp. The time-of-measurement data indicates when, in terms of a clock in the switching unit 106, each of the current PCR and new PCR time stamps were measured. Then, at step 508, an offset PCR value may be computed as follows:

$$TOM_2 - TOM_1 + TS_1 - TS_2,$$

where $TOM_2$ represents the time-of-measurement for the new PCR time stamp, $TOM_1$ represents the time-of-measurement for the current PCR time stamp, $TS_1$ represents the current PCR time stamp, and $TS_2$ represents the new PCR time stamp. As is apparent, the second equation yields the first equation if the time-of-measurements are identical. In either embodiment, at step 510, the offset PCR value is added to each subsequent PCR time stamp in the new bitstream. The process 500 ends at step 512.

Figure 6:
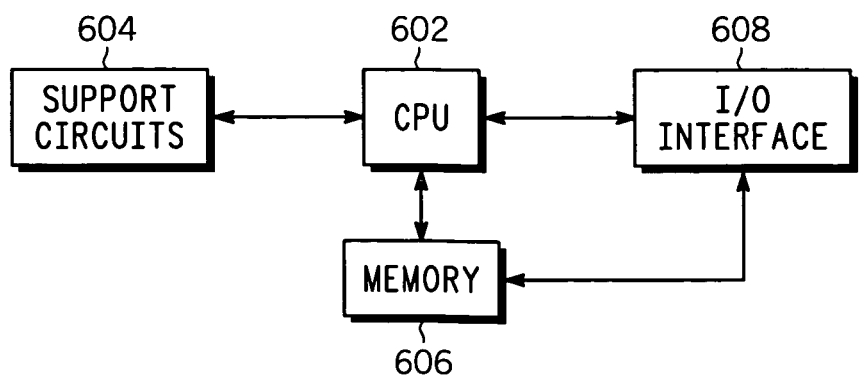
FIG. 6 depicts a block diagram showing an exemplary embodiment of a computer system suitable for implementing processes, methods, and systems described herein.

FIG. 6 depicts a block diagram showing an exemplary embodiment of a computer system 600 suitable for implementing processes, methods, and systems described herein. The computer system 600 includes a central processing unit (CPU) 602, a memory 606, a variety of support circuits 604, and an input/output (I/O) interface 608. The CPU 602 may be any type of microprocessor known in the art. The support circuits 604 for the CPU 602 include conventional cache, power supplies, clock circuits, data registers, I/O interfaces, and the like. The I/O interface 608 may be directly coupled to the memory 606 or coupled through the CPU 602, and may be coupled to a conventional keyboard, network, mouse, printer, and interface circuitry adapted to receive and transmit data, such as data files and the like.

The memory 606 may store all or portions of one or more programs or data to implement the processes, methods, and systems of the invention. The memory 606 may include one or more of the following random access memory, read only memory, magneto-resistive read/write memory, optical read/write memory, cache memory, magnetic read/write memory, and the like, as well as various signal-bearing media.

While the foregoing is directed to illustrative embodiments of the present invention, other and further embodiments of the invention may be devised without departing from the basic scope thereof, and the scope thereof is determined by the claims that follow.

The invention claimed is:

1. A method of switching a source for an audiovisual program configured for distribution among a plurality of user terminals, comprising:
   receiving a first real-time digital bitstream and a second real-time digital bitstream, said source being said first real-time digital bitstream;
   receiving a request from a remote controller operative to switch said source of said audiovisual program;
   switching said source to said second real-time digital bitstream in response to said request;
   adjusting time stamp data in said second real-time digital bitstream to provide a continuous time base for said audiovisual program;
   receiving a return request from said remote controller operative to return said source to said first real-time digital bitstream;
   returning said source to said first real-time digital bitstream in response to said return request; and
   adjusting time stamp data in said first real-time digital bitstream to maintain said continuous time base for said audiovisual program.

2. The method of claim 1, wherein said request indicates an indefinite substitution period, and wherein the method further comprises:
   receiving an additional real-time digital bitstream;
   receiving an additional request from said remote controller operative to switch said source of said audiovisual program;
   switching said source to said additional real-time digital bitstream in response to said additional request; and
   adjusting time stamp data in said additional real-time digital bitstream to maintain said continuous time base for said audiovisual program.

3. The method of claim 2, further comprising:
   returning said source to said first real-time digital bitstream; and
   adjusting time stamp data in said first real-time digital bitstream to maintain said continuous time base for said audiovisual program.

4. The method of claim 1, wherein said request is in a format compliant with SCTL-30.

5. The method of claim 1, wherein each of said first real-time digital bitstream and said second real-time digital bitstream comprises a live feed from a feed network.

6. The method of claim 1, wherein said switching comprises:
   splicing at least one of an audio stream, a video stream, and an ancillary data stream in said second real-time digital bitstream with a respective at least one of an audio stream, a video stream, and an ancillary data stream in said first real-time digital bitstream.

7. The method of claim 6, wherein said splicing is performed without decoding said first real-time digital bitstream and said second real-time digital bitstream.

8. The method of claim 6, further comprising: adjusting the bit-rate of said second real-time digital bitstream for a predefined period in response to said splicing.

9. The method of claim 1, wherein said adjusting step comprises:
obtaining a first time stamp for said first real-time digital bitstream and a second time stamp for said second real-time digital bitstream;
computing an offset using said first time stamp and said second time stamp; and
adding said offset to additional time stamps within said second real-time digital bitstream.

10. The method of claim 9, further comprising:
identifying a first time-of-measurement for said first time stamp and a second time-of-measurement for said second time stamp;
wherein said offset is further computed using said first time-of-measurement and said second time-of-measurement.

11. The method of claim 10, wherein said offset is computed as:
$TOM_2 - TOM_1 + TS_1 - TS_2$, where $TOM_2$ represents said second time-of-measurement, $TOM_1$ represents said first time-of-measurement, $TS_1$ represents said first time stamp, and $TS_2$ represents said second time stamp.

12. The method of claim 10, wherein each of said first time stamp and said second time stamp is a program clock reference (PCR) time stamp.

13. Apparatus for switching a source of an audiovisual program configured for distribution among a plurality of user terminals, comprising:
a first interface for receiving a first real-time digital bitstream;
a second interface for receiving a second real-time digital bitstream;
a third interface for receiving request data from a remote controller, said request data operative to switch said source of said audiovisual program;
a switch circuit for switching said source between said first real-time digital bitstream and said second real-time digital bitstream in response to said request data1 wherein said switch circuit is configured to switch said source to said second real-time digital bitstream in response to a request from said remote controller for an indefinite period, and to return said source to said first real-time digital bitstream in response to a return request from said remote controller; and
a time stamp adjustment circuit for adjusting time stamp data in a bitstream mapped to said audiovisual program to provide a continuous time base therefor.

14. The apparatus of claim 13, wherein said third interface is configured to receive request data in a format compliant with SCTL-30.

15. A distribution system for providing an audiovisual program to a plurality of user terminals, comprising:
a first interface for receiving a first real-time digital bitstream;
a second interface for receiving a second real-time digital bitstream;
a remote controller for generating request data operative to switch a source of said audiovisual program;
a switching device, coupled to said remote controller, said first interface, and said second interface, said switching device including:
a switch circuit for switching said source between said first real-time digital bitstream and said second real-time digital bitstream in response to said request data, wherein said switch circuit is configured to switch said source to said second real-time digital bitstream in response to a request from said remote controller for an indefinite period, and to return said source to said first real-time digital bitstream in response to a return request from said remote controller; and
a time stamp adjustment circuit for adjusting time stamp data in a bitstream mapped to said audiovisual program to provide a continuous time base therefor.

16. The system of claim 15, wherein said remote controller is configured to generate said request data in a format compliant with SCTL-30.

17. The system of claim 15, wherein said remote controller is coupled to said switching device via a transmission control protocol/internet protocol (TCP/IP) network.

18. The system of claim 15, wherein each of said first real-time digital bitstream and said second real-time digital bitstream comprises a live feed from a feed network.

19. Apparatus for switching a source of an audiovisual program configured for distribution among a plurality of user terminals, comprising:
means for receiving a first real-time digital bitstream and a second real-time digital bitstream, said source being said first real-time digital bitstream;
means for receiving a request from a remote controller operative to switch said source of said audiovisual program;
means for switching said source to said second real-time digital bitstream in response to said request;
means for adjusting time stamp data in said second real-time digital bitstream to provide a continuous time base for said audiovisual program;
means for receiving a return request from said remote controller operative to return said source to said first real-time digital bitstream;
means for returning said source to said first real-time digital bitstream in response to said return request; and
means for adjusting time stamp data in said first real-time digital bitstream to maintain said continuous time base for said audiovisual program.

* * * * *

UNITED STATES PATENT AND TRADEMARK OFFICE
CERTIFICATE OF CORRECTION

PATENT NO. : 7,502,368 B2 Page 1 of 1
APPLICATION NO. : 10/820595
DATED : March 10, 2009
INVENTOR(S) : Sanders et al.

It is certified that error appears in the above-identified patent and that said Letters Patent is hereby corrected as shown below:

COLUMN 8:
Line 54: In Claim 4, please delete "SCTL-30." and replace with --SCTE-30.--

COLUMN 9:
Line 23: In Claim 11, please delete "TO M$^1$" and replace with --TOM$_1$--
Line 41: In Claim 13, please delete "data1" and replace with --data,--
Line 53: In Claim 14, please delete "SCTL-30." and replace with --SCTE-30.--

COLUMN 10:
Line 25: In Claim 16, please delete "SCTL-30." and replace with --SCTE-30.--

Signed and Sealed this

Twenty-eighth Day of July, 2009

JOHN DOLL
*Acting Director of the United States Patent and Trademark Office*